(12) United States Patent
Sironko et al.

(10) Patent No.: US 7,749,424 B2
(45) Date of Patent: *Jul. 6, 2010

(54) VACUUM-INFUSED FIBERGLASS-REINFORCED FENESTRATION FRAMING MEMBER AND METHOD OF MANUFACTURE

(75) Inventors: Philip T. Sironko, Perrysburg, OH (US); Chris Gorman, Puyallup, WA (US)

(73) Assignee: Milgard Manufacturing, Inc., Tacoma, WA (US)

( * ) Notice: Subject to any disclaimer, the term of this patent is extended or adjusted under 35 U.S.C. 154(b) by 766 days.

This patent is subject to a terminal disclaimer.

(21) Appl. No.: 11/513,621

(22) Filed: Aug. 31, 2006

(65) Prior Publication Data

US 2008/0057288 A1 Mar. 6, 2008

(51) Int. Cl.
*B29C 70/02* (2006.01)
(52) U.S. Cl. .................. 264/553; 264/544; 264/546; 264/552; 264/570; 264/571
(58) Field of Classification Search .............. 264/32, 264/544, 546, 552, 553, 570, 571, 101
See application file for complete search history.

(56) References Cited

U.S. PATENT DOCUMENTS

| | | | |
|---|---|---|---|
| 2,495,640 A | 1/1950 | Muskat | |
| 2,913,036 A | 11/1959 | Smith | |
| 3,146,148 A | 8/1964 | Mitchella et al. | |
| 3,962,394 A * | 6/1976 | Hall | 264/573 |
| 4,432,179 A | 2/1984 | Bachmann | |
| 4,831,781 A | 5/1989 | Morton | |
| 4,902,215 A * | 2/1990 | Seemann, III | 425/406 |
| 4,942,013 A * | 7/1990 | Palmer et al. | 264/511 |
| 5,052,906 A * | 10/1991 | Seemann | 425/112 |
| 5,316,462 A * | 5/1994 | Seemann | 425/112 |
| 5,406,768 A | 4/1995 | Giuseppe et al. | |
| 5,439,635 A * | 8/1995 | Seemann | 264/510 |
| 5,497,594 A | 3/1996 | Giuseppe et al. | |
| 5,866,210 A | 2/1999 | Rosynski et al. | |

(Continued)

FOREIGN PATENT DOCUMENTS

EP 0269470 6/1988

(Continued)

OTHER PUBLICATIONS

English machine translation of EP 0269470.*

*Primary Examiner*—Joseph S Del Sole
*Assistant Examiner*—Timothy Kennedy
(74) *Attorney, Agent, or Firm*—Reising Ethington PC

(57) ABSTRACT

A method of making a fenestration framing member includes providing a core of desired cross section and geometry lengthwise of the core. A fiberglass mat is placed around the core to form a fiberglass-enclosed core, and resin is vacuum infused into the mat to form a fenestration framing member that includes fiberglass-reinforced resin enclosing the core. The starting core and the final fenestration framing member preferably are of curved geometry lengthwise of the core and member. The step of vacuum infusing resin into the mat surrounding the core preferably is carried out by placing the fiberglass-enclosed core into a vacuum enclosure, preferably a vacuum bag, and connecting the vacuum enclosure to a vacuum source and a resin source.

4 Claims, 3 Drawing Sheets

U.S. PATENT DOCUMENTS

| | | |
|---|---|---|
| 5,934,030 A | 8/1999 | McDonald |
| 6,003,277 A | 12/1999 | Graham et al. |
| 6,295,779 B1 | 10/2001 | Canfield |
| 6,453,631 B1 | 9/2002 | Headrick |
| 6,454,251 B1 | 9/2002 | Fish |
| 6,468,613 B1 | 10/2002 | Kitano et al. |
| 6,537,483 B1 | 3/2003 | Cartwright et al. |
| 6,586,054 B2 | 7/2003 | Walsh |
| 6,840,750 B2 | 1/2005 | Thrash et al. |
| 2002/0069604 A1 | 6/2002 | Canfield |
| 2002/0155186 A1 | 10/2002 | Walsh |
| 2002/0185785 A1 | 12/2002 | Thrash et al. |
| 2003/0019567 A1 | 1/2003 | Burpo et al. |
| 2003/0102604 A1* | 6/2003 | Mack et al. ............. 264/571 |
| 2003/0186035 A1 | 10/2003 | Cruce et al. |
| 2004/0003886 A1* | 1/2004 | Hunter ................. 156/219 |
| 2004/0051214 A1* | 3/2004 | Sheu et al. ............. 264/511 |
| 2004/0155385 A1* | 8/2004 | Johnson et al. ......... 264/511 |
| 2004/0157519 A1 | 8/2004 | Goodell et al. |
| 2004/0185733 A1 | 9/2004 | Murai et al. |
| 2004/0256053 A1 | 12/2004 | Burpo et al. |
| 2005/0032594 A1 | 2/2005 | Goldsmith et al. |
| 2005/0073076 A1* | 4/2005 | Woods et al. ........... 264/511 |

FOREIGN PATENT DOCUMENTS

| | | |
|---|---|---|
| FR | 2822408 A1 * | 9/2002 |
| NL | 8601901 | 2/1988 |
| WO | WO 95/32849 | 12/1995 |
| WO | WO 96/40488 | 12/1996 |

\* cited by examiner

VACUUM-INFUSED FIBERGLASS-REINFORCED FENESTRATION FRAMING MEMBER AND METHOD OF MANUFACTURE

The present disclosure relates to manufacture of fenestration framing members (sash and/or frame), particularly fenestration rails having a curved geometry lengthwise of the rails.

BACKGROUND AND SUMMARY OF THE DISCLOSURE

A general object of the present disclosure is to provide a method of making a fenestration framing member of desired geometry lengthwise of the member, including particularly a curved geometry lengthwise of the member, for half-round, round, eyebrow-shaped, quarter-round, arched or circular vents above windows or doors, and to provide a fenestration framing member product resulting from such method.

The present disclosure embodies a number of aspects that can be implemented separately from or in combination with each other.

A method of making a fenestration framing member in accordance with one aspect of the present disclosure includes providing a core of desired cross section and geometry lengthwise of the core. A fiberglass mat is placed around the core to form a fiberglass-enclosed core, and resin is vacuum infused into the mat to form a fenestration framing member that includes fiberglass-reinforced resin enclosing the core. The starting core and the final fenestration framing member preferably are of curved geometry lengthwise of the core and member. The step of vacuum infusing resin into the mat surrounding the core preferably is carried out by placing the fiberglass-enclosed core into a vacuum enclosure, preferably a vacuum bag, and connecting the vacuum enclosure to a vacuum source and a resin source.

BRIEF DESCRIPTION OF THE DRAWINGS

The disclosure, together with additional objects, features, advantages and aspects thereof, will best be understood from the following description, the appended claims and the accompanying drawings, in which:

DETAILED DESCRIPTION OF PREFERRED EMBODIMENTS

Figure 1:
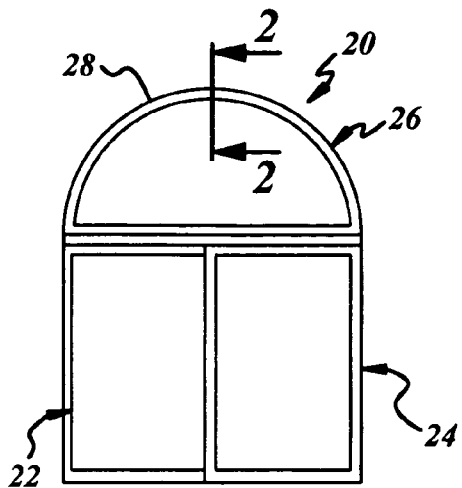
FIG. 1 is a schematic diagram of a fenestration product that includes at least one fenestration framing member in accordance with an exemplary implementation of the present disclosure.

FIG. 1 illustrates a window or door 20 that includes a pair of panels 22,24 and a half-round half vent 26 overlying panels 22,24. Vent 26 includes a curving fenestration framing member 28, which is half-round or semi-circular in this example. Framing member 28 is manufactured in accordance with the present disclosure. The linear fenestration members of vent 26 and panels 22,24 (which can be fixed or movable sashes and/or frames) also could be manufactured in accordance with the present disclosure, although conventional manufacturing techniques for linear framing members would be less expensive. A half-round or semicircular member 28 is illustrated by way of example. Other non-linear member geometries include round, eyebrow-shaped, quarter-round, arched and circular.

Figure 2:
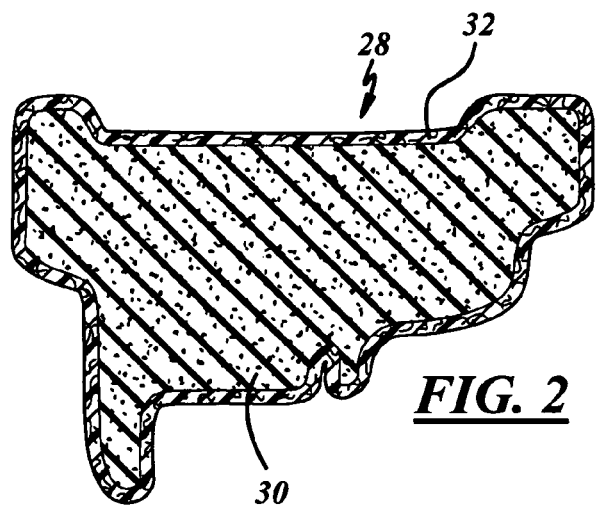
FIG. 2 is a sectional view taken substantially along the line 2-2 in FIG. 1.

FIG. 2 illustrates an exemplary cross section of member 28 as including a core 30 of desired cross section and a skin layer 32 of fiberglass-reinforced resin. There could be additional layers outside of layer 32, and there could be reinforcement within core 30, without departing from the scope of the present disclosure. Core 30 preferably is of cellular vinyl construction, most preferably PVC, although any core material could be employed in accordance with the broadest aspects of the present disclosure. The resin of layer 32 may be of any suitable material such as polyester, polyurethane, vinyl ester or any other resin used in fiberglass materials manufacture.

Figure 3:
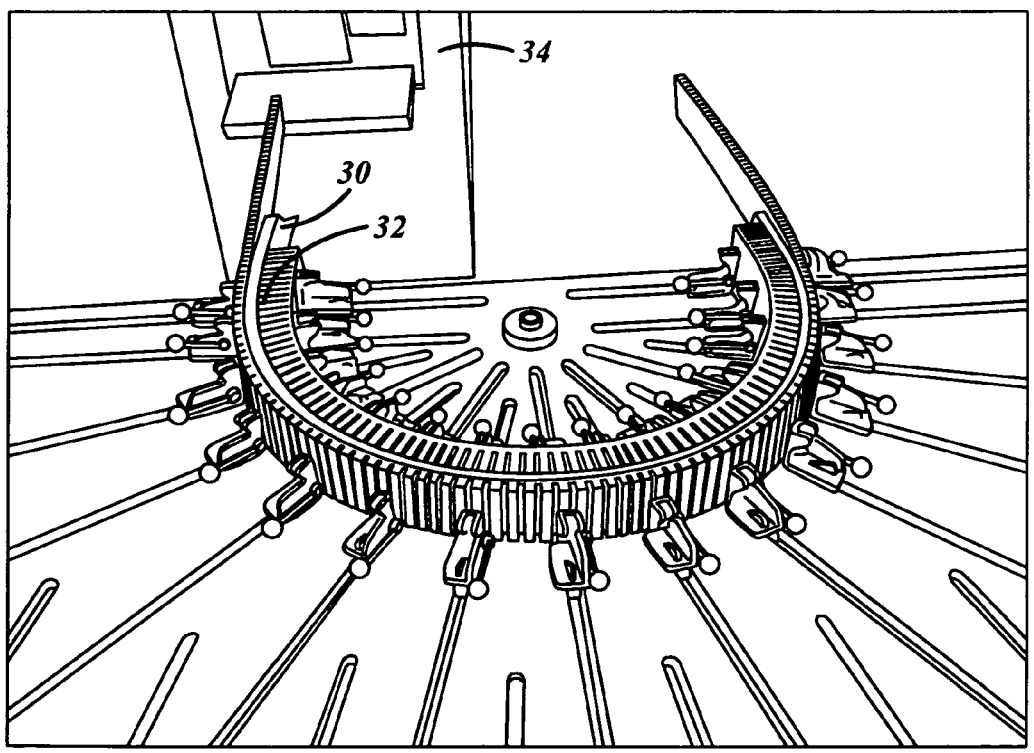
FIGS. 3-8 are schematic diagrams that illustrate manufacture of the fenestration framing member illustrated in FIG. 2 in accordance with an exemplary embodiment of the present disclosure.
Figure 4:
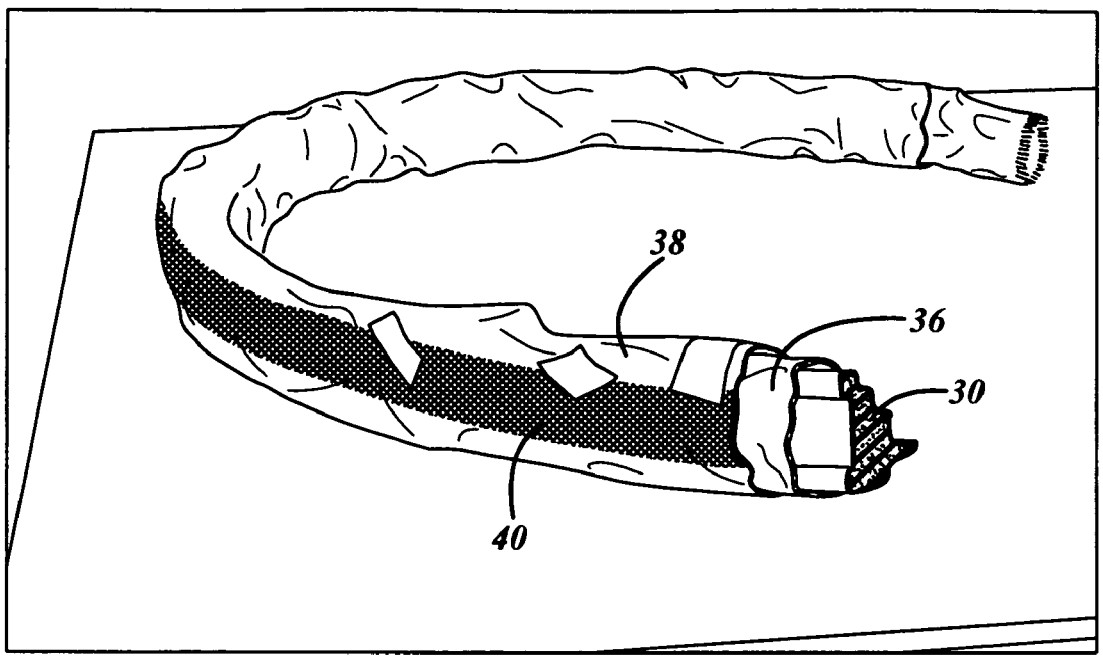
Figure 5:
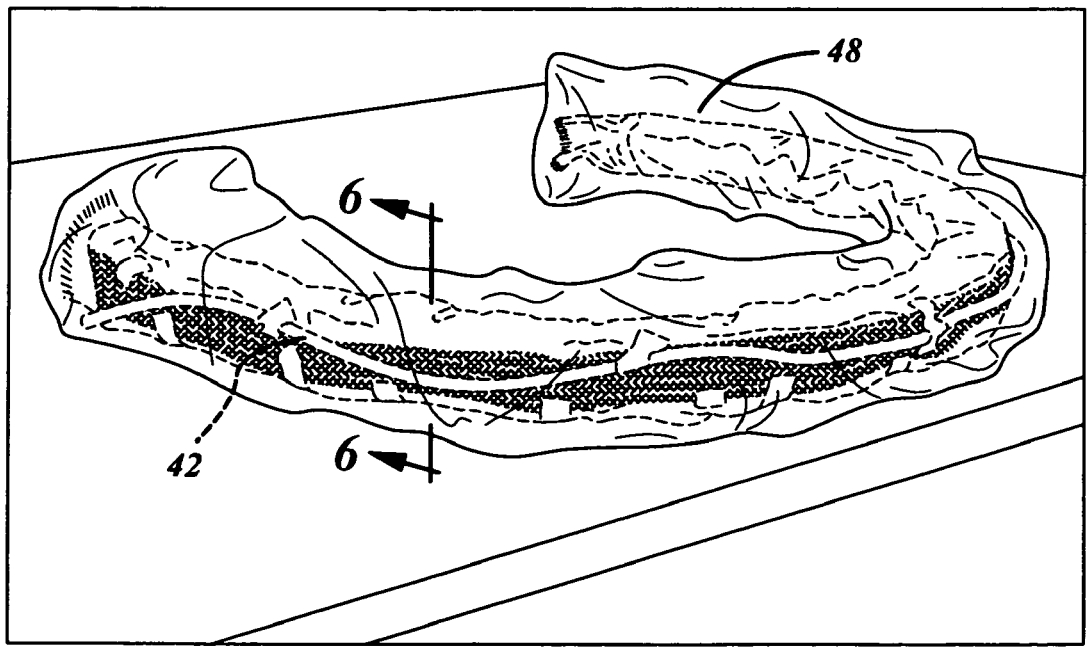
Figure 6:
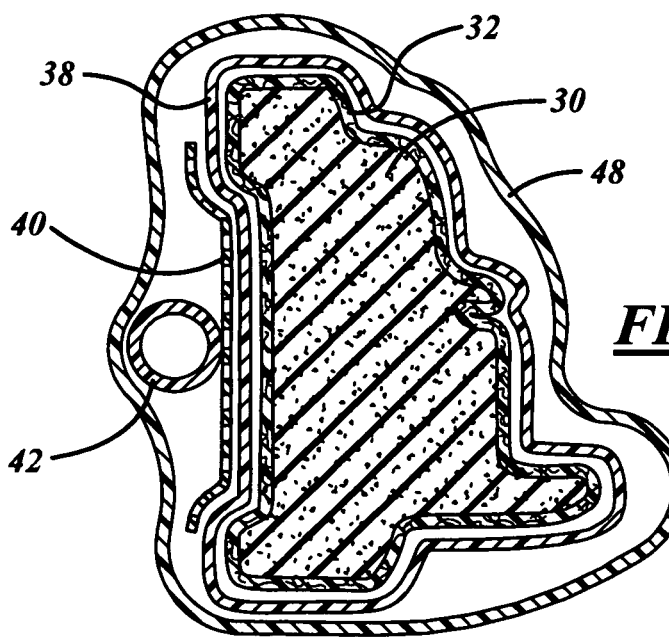

FIGS. 3-8 are schematic diagrams that illustrate manufacture of member 28 in accordance with an exemplary embodiment of the present disclosure. Referring to FIG. 3, core 30 is heated and then placed in a fixture 32 for forming core 30 into the desired lengthwise geometry, semi-circular in this example. Core 30 can be precut and heated in an oven 34, for example, or may be drawn into fixture 32 directly from an extruder. When core 30 has cooled sufficiently to retain the desired shape, the core is removed from fixture 32 and a fiberglass mat 36 (FIG. 4) is placed around the core to form a fiberglass-enclosed core. Mat 36 preferably is a woven mat of fiberglass material that is wrapped around core 30. A peel ply 38 may then be wrapped around mat 36 to facilitate removal from mat 36 and to provide a good surface finish to mat 36 when infused by resin material. Peel ply 38, when employed, can be of any suitable porous material. A flow medium 40 may then be placed over peel ply 38. Flow medium 40, when employed, preferably is an open screen of plastic material that promotes diffusion of resin through peel ply 38 into mat 36.

Figure 7:
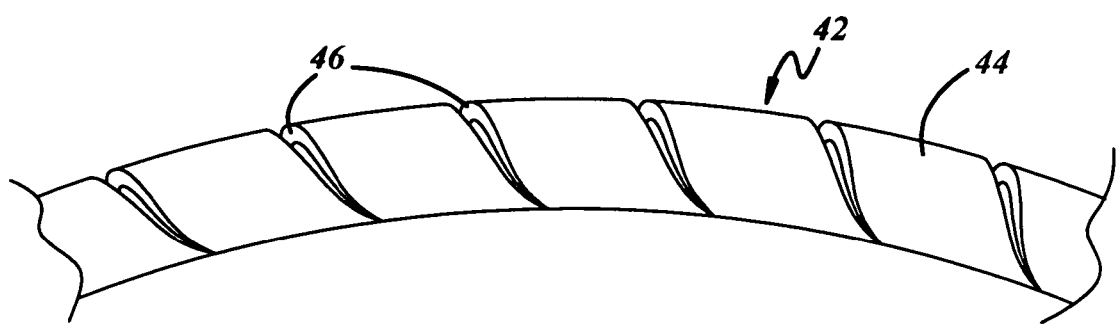
Figure 8:
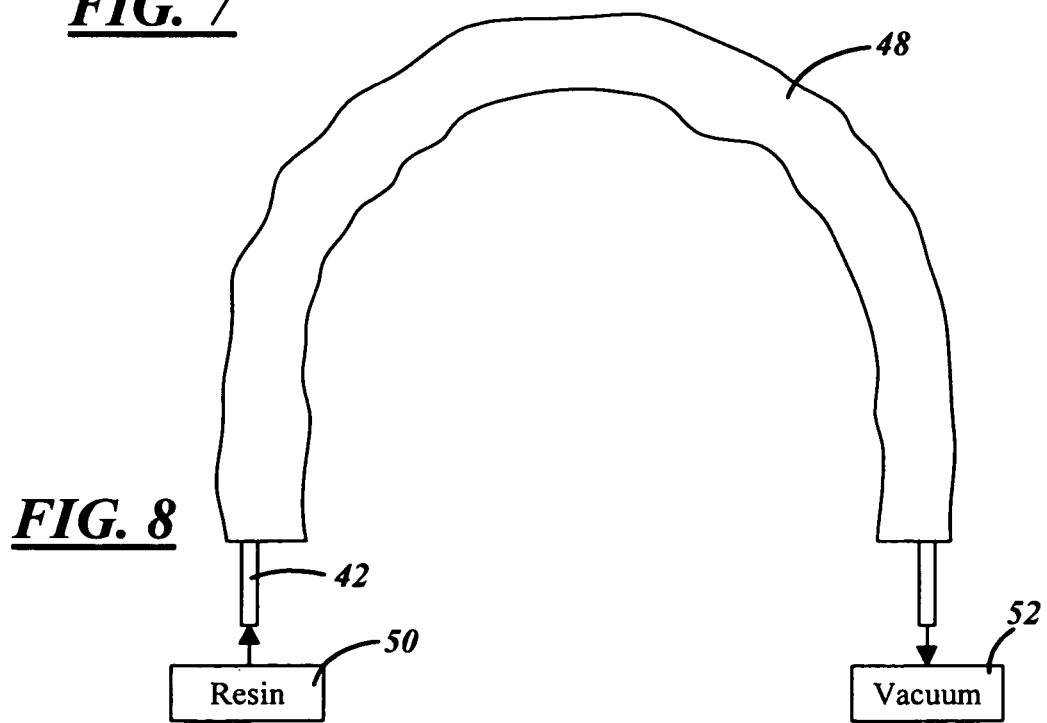

A length of tubing 42 (FIGS. 5-7) preferably is then placed over flow medium 40 and suitably held in place. Tubing 42 may be of any suitable material. Exemplary tubing is illustrated in FIG. 7 as comprising a spiral wrap of plastic ribbon 44 that provides spiral apertures or gaps 46 between wraps of the ribbon, through which resin material can escape from tubing 42 into mat 36 during the vacuum infusion operation. This assembly is then enclosed in a vacuum enclosure 48 (FIGS. 5, 6 and 8), which preferably is a plastic bag. The ends of tubing 42 that extend from vacuum enclosure 48 are respectively connected to a source 50 (FIG. 8) of resin and to a source 52 of vacuum. Additional components such as accumulators and valves can be employed if desired. Vacuum source 52 is energized to evacuate vacuum enclosure 48 and draw resin from source 50 into the vacuum enclosure. This resin flows through the spiral gaps 46 in tubing 42, through flow medium 40 and peel ply 38 where employed, into mat 36 surrounding core 30. The drawn vacuum also causes mat 36 tightly to surround core 30. After a suitable time, vacuum source 52 is de-energized, sources 50, 52 are disconnected from tubing 42, and the resin in mat 36 is allowed to cool and cure to form fiber-reinforced skin layer 32 (FIG. 2) closely surrounding core 30.

FIGS. 3-6 illustrate a presently preferred but exemplary process in accordance with the present disclosure. Other processes can by employed for vacuum infusion of resin into a fiberglass mat or layer surrounding the fenestration framing member core without departing from the scope of the present disclosure. As noted above, the process of the present disclosure is particularly suitable for manufacture of curving fenestration framing members, although the process could be implemented for manufacture of linear fenestration framing members. The member 1 core could be of any suitable material. Any suitable resin could be employed for vacuum infusion of the layer surrounding the core. The disclosure is intended to embrace these and all other modifications and variations as fall within the spirit and broad scope of the appended claims.

The invention claimed is:

1. A method of making a fenestration framing member that includes the steps of:
   (a) providing a core having a cross section and a lengthwise geometry desired for said fenestration framing member,
   (b) placing a fiberglass mat around said core to form a fiberglass-enclosed core, and
   (c) vacuum infusing resin into said mat to form a fenestration framing member of desired cross section and lengthwise geometry that includes fiberglass-reinforced resin enclosing said core,
   wherein said step (c) includes:
   (c1) placing a peel ply around said fiberglass-enclosed core,
   (c2) placing a flow medium over said peel ply,
   (c3) placing tubing over said flow medium, said tubing having apertures,
   said tubing comprises a spiral wrap of plastic ribbon having said apertures as spiral apertures formed by gaps between wraps of said ribbon,
   (c4) placing the product of said step (c3) into a vacuum enclosure,
   (c5) connecting said tubing to a vacuum source and a source of resin to draw resin into said vacuum enclosure and infusing the resin through the apertures in said tubing, through said flow medium and said peel ply into said fiberglass mat,
   (c6) removing said vacuum enclosure, and
   (c7) removing said tubing, said flow medium and said peel ply leaving said fenestration framing member.

2. The method set forth in claim 1 wherein said vacuum enclosure is a vacuum bag.

3. The method set forth in claim 1 wherein said core is of curved geometry lengthwise of said core.

4. The method set forth in claim 3 wherein said core is of cellular PVC.

* * * * *